(12) United States Patent
Zavadsky et al.

(10) Patent No.: US 8,457,562 B2
(45) Date of Patent: *Jun. 4, 2013

(54) DIGITIZED REVERSE LINK MONITOR

(75) Inventors: Dean Zavadsky, Shakopee, MN (US); Philip M. Wala, Waseca, MI (US); Bernard K. Wiwel, Bloomington, MN (US)

(73) Assignee: ADC Telecommunications, Inc., Shakopee, MN (US)

( * ) Notice: Subject to any disclaimer, the term of this patent is extended or adjusted under 35 U.S.C. 154(b) by 1274 days.

This patent is subject to a terminal disclaimer.

(21) Appl. No.: 11/692,028

(22) Filed: Mar. 27, 2007

(65) Prior Publication Data
US 2008/0242232 A1     Oct. 2, 2008

(51) Int. Cl.
*H04B 17/00* (2006.01)
(52) U.S. Cl.
USPC ................ 455/67.11; 455/67.13; 455/67.14
(58) Field of Classification Search
USPC ............................. 455/67.11, 67.13, 67.14
See application file for complete search history.

(56) References Cited

U.S. PATENT DOCUMENTS

| | | | |
|---|---|---|---|
| 4,183,054 A | 1/1980 | Patisaul et al. |
| 4,611,323 A | 9/1986 | Hessenmiiller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Lee |
| 5,243,598 A | 9/1993 | Lee |
| 5,321,849 A | 6/1994 | Lemson |
| 5,339,184 A | 8/1994 | Tang |
| 5,680,395 A | 10/1997 | Weaver, Jr. et al. |
| 6,212,397 B1 * | 4/2001 | Langston et al. ............. 455/500 |
| 6,480,722 B1 * | 11/2002 | Takada et al. ................ 455/501 |
| 6,567,987 B1 | 5/2003 | Farhan et al. |
| 6,829,471 B2 | 12/2004 | White et al. |
| 7,006,483 B2 | 2/2006 | Nelson, Jr. et al. |
| 7,046,966 B2 | 5/2006 | Davis |
| 7,603,093 B2 * | 10/2009 | Kremer et al. ............. 455/233.1 |
| 2006/0019694 A1 | 1/2006 | Sutivong et al. |

FOREIGN PATENT DOCUMENTS

| | | |
|---|---|---|
| EP | 0391597 | 10/1990 |
| EP | 1081882 | 3/2001 |
| WO | 9115927 | 10/1991 |
| WO | 9719531 | 5/1997 |

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.
Harvey et al., "Cordless Communications Utilising Radio Over Fibre Techniques for the Local Loop", "IEEE International Conference on Communications",Jun. 1991 , pp. 1171-1175, Publisher: IEEE.

* cited by examiner

*Primary Examiner* — Nay A Maung
*Assistant Examiner* — Angelica M Perez
(74) *Attorney, Agent, or Firm* — Fogg & Powers LLC (57) ABSTRACT

A method of monitoring a broadband digitized reverse link system comprising monitoring at least one radio frequency down-convert path in at least one remote unit in the digitized reverse link system using an internal tone generating system, digitally verifying the health of at least one digitized communication link communicatively coupled to receive digital signals from a respective remote unit, and monitoring the health of a radio frequency up-convert path in a host unit communicatively coupled to receive the digital signals from the at least one digitized communication link in the digitized reverse link system using a wideband power detector in the host unit.

12 Claims, 6 Drawing Sheets

DIGITIZED REVERSE LINK MONITOR

CROSS REFERENCE TO RELATED APPLICATIONS

This application is related to U.S. patent application Ser. No. 11/302,723 having a title of "A SYSTEM AND METHOD TO MONITOR BROADBAND RADIO FREQUENCY TRANSPORT SYSTEMS" (also referred to here as the "'723 application") filed on Dec. 14, 2005. The '723 application is incorporated herein by reference.

BACKGROUND

In broadband digitized transport systems that simultaneously broadcast signals from remote users via remote units to a receiving station, a plurality of reverse paths simultaneously transmit data to the receiving station. Each digitized reverse path includes a digitized communication link between a remote unit and a host unit. The section of the reverse path that includes the remote unit and the host unit amplifies the signal received at the remote unit. The host unit is in communication with the receiving station. In some cases the host unit is co-located with the receiving station. The transport link can be any type of communication medium such as an optical fiber, a coaxial cable or a free-space optical link.

The signals from a host unit are provided to the receiving station. If one of the digitized reverse paths loses gain, the receiving station will not necessarily be able to determine the system has degraded since the relative drop in power is within the noise level of the receiving station. If the receiving station does, however, detect a loss in gain in one or more of the transport links, the receiving station is not able to determine if the loss is in one of the digital links between the remote units and the host unit, if the loss is in the up-convert path in the host unit, or if the loss is in the down-convert path in one of the remote units.

Thus, one or more of the remote units in communication with a receiving station via a single host unit can experience a degraded communication and the controllers at the receiving station will be unaware of the problem. This can lead to poorly performing transport systems and customer dissatisfaction. Moreover, if the receiving station recognizes that signals received from the host unit are degraded or inadequately amplified, each reverse path is subjected to troubleshooting procedures to determine which path (the digitized communication link between the remote unit and the host unit, the up-convert path in the host unit or the down-convert path in the remote unit) is degraded. This response is time consuming and expensive.

For the reasons stated above and for other reasons stated below which will become apparent to those skilled in the art upon reading and understanding the specification, there is a need in the art for monitoring gain in remote reverse link radio frequency stages in simulcast architectures.

SUMMARY

The embodiments of the present invention provide methods and systems for monitoring gain in remote reverse link radio frequency stages and will be understood by reading and studying the following specification.

In a first embodiment, a method of monitoring a broadband digitized reverse link system comprises monitoring at least one radio frequency down-convert path in at least one remote unit in the digitized reverse link system using an internal tone generating system, digitally verifying the health of at least one digitized communication link communicatively coupled to receive digital signals from a respective remote unit, and monitoring the health of a radio frequency up-convert path in a host unit communicatively coupled to receive the digital signals from the at least one digitized communication link in the digitized reverse link system using a wideband power detector in the host unit.

In a second embodiment, a system to monitor a broadband digitized reverse link comprises at least one remote unit, a remote controller, and one host unit communicable with at least one digitized communication link. Each remote unit is configured to receive a radio frequency signal and comprises a pilot tone generator, at least one radio frequency down-converter, a remote pilot tone receiver circuit, and a remote controller. The pilot tone generator generates at least one single-frequency tone having a known power level. The at least one radio frequency down-converter is in communication with a signal summing circuit to digitize the combined signal. The remote pilot tone receiver circuit receives a narrowband digitized signal. The remote controller compares the known power level of the single-frequency tone to the power level of the narrowband digitized signal.

The host unit receives the digitized combined signals sent from the at least one remote unit via respective ones of the at least one digitized communication link. Each host unit comprises a baseband digital power detector, at least one radio frequency up converter, a wideband power detector, and a host unit controller. The baseband digital power detector detects the digitized summed signal. The at least one radio frequency up converter is communicatively coupled to the baseband digital power detector. The wideband power detector is in communication with the radio frequency up converter to detect the up-converted summed signal. The host unit controller compares information indicative of the digitized summed signal with information indicative of the up-converted summed signal in order to determine the health of the up-converter path.

In a third embodiment, a remote unit, which is communicable with a radio frequency antenna, comprises a pilot tone generator, a signal summing circuit, at least one radio frequency down-converter, a remote pilot tone receiver circuit, a remote pilot tone receiver circuit, and a remote controller. The pilot tone generator generates at least one single-frequency tone having a known power level. The signal summing circuit is operably associated with the pilot tone generator to sum the single-frequency tone with the received radio frequency signal to form a combined signal. The at least one radio frequency down-converter is in communication with the signal summing circuit to digitize the combined signal. The remote pilot tone receiver circuit receives a narrowband digitized signal. The remote controller compares the known power level of the single-frequency tone to the power level of the narrowband digitized signal to monitor the health of the down-converter path.

In a fourth embodiment, a host unit receives the digitized combined signals sent from at least one remote unit via at least one digitized communication link. The host unit comprises a data transport circuit, a baseband digital power detector, at least one radio frequency up converter, a wideband power detector, and a host unit controller. The data transport circuit sums the digitized combined signals to form a digitized summed signal. The baseband digital power detector detects the digitized summed signal. The at least one radio frequency up converter is communicatively coupled to the baseband digital power detector. The wideband power detector is in communication with the radio frequency up converter to detect the up-converted summed signal. The host unit controller that compares information indicative of the digitized summed signal with information indicative of the up-converted summed signal in order to determine the health of the up-converter path.

In a fifth embodiment, a system to monitor a broadband digitized reverse link comprises at least one radio frequency antenna, at least one remote unit, and one host unit communicable with at least one digitized communication link. The at least one radio frequency antenna receives a radio frequency signal. Each remote unit is communicable with a respective one of the radio frequency antennae and a digitized communication link.

Each remote unit comprises a pilot tone generator, a signal summing circuit, at least one radio frequency down-converter, a remote pilot tone receiver circuit, and a remote controller. The pilot tone generator generates at least one single-frequency tone having a known power level. The signal summing circuit is operably associated with the pilot tone generator to sum the single-frequency tone with the received radio frequency signal to form a combined signal. The at least one radio frequency down-converter is in communication with the signal summing circuit to digitize the combined signal. The remote pilot tone receiver circuit receives a narrowband digitized signal. The remote controller compares the known power level of the single-frequency tone to the power level of the narrowband digitized signal.

The host unit is configured to receive the digitized combined signals sent from the at least one remote unit via respective ones of the at least one digitized communication link. Each host unit comprises a data transport circuit, baseband digital power detector, at least one radio frequency up converter, a wideband power detector, and a host unit controller. The data transport circuit sums the digitized combined signals to form a digitized summed signal. The baseband digital power detector detects the digitized summed signal. The at least one radio frequency up converter is communicatively coupled to the baseband digital power detector. The wideband power detector is in communication with the radio frequency up converter to detect the up-converted summed signal. The host unit controller compares information indicative of the digitized summed signal with information indicative of the up-converted summed signal to determine the health of the up-converter path.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 3A:
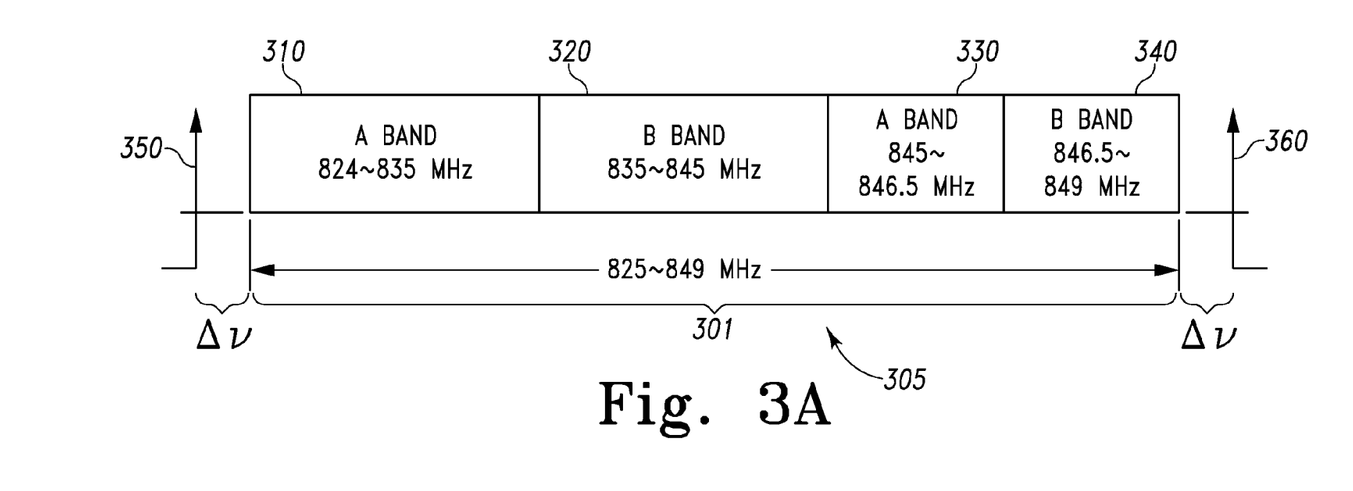
FIGS. 3A and 3B show exemplary broadband frequency spectra and sub-bands within the frequency spectra and the position of exemplary pilot tones with respect to the frequency spectrum.
Figure 3B:
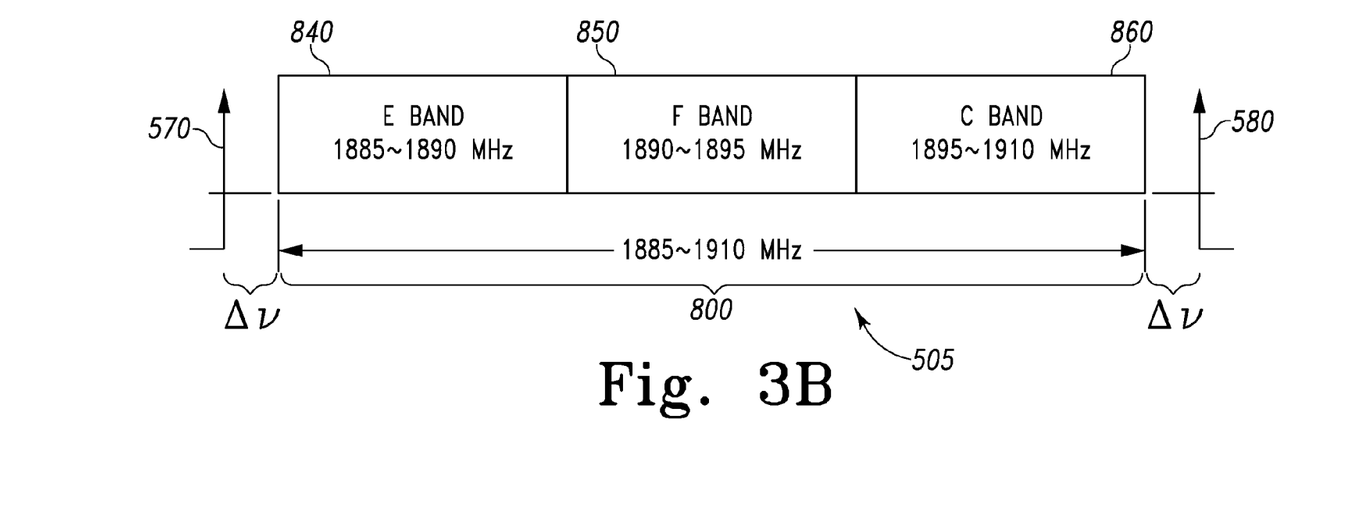

The broadband digitized transport systems described herein are wideband radio frequency transport systems such as cellular wireless systems in which multiple signals within the broad band spectra (as shown in FIGS. 3A and 3B) are simultaneously transmitted and received.

Figure 1:
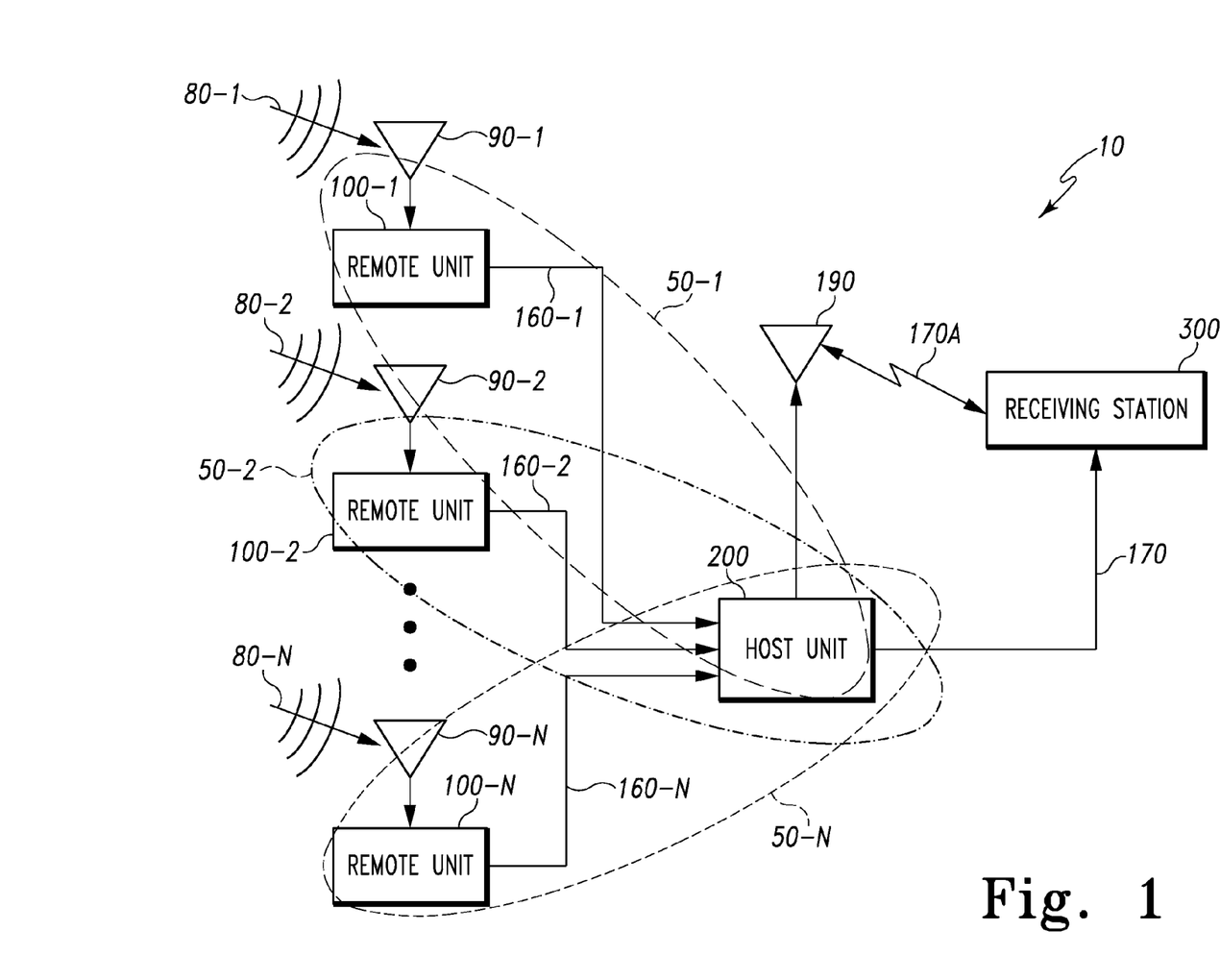
FIG. 1 illustrates a digitized reverse link system in accordance with a first embodiment of the present invention.

FIG. 1 illustrates a digitized reverse link system 10 in accordance with a first embodiment of the present invention. The radio frequency antennae 90 (1-N) receive radio frequency signals represented generally by the numeral 80-$i$. Each digitized reverse path transport link represented generally by the numeral 50-$i$ includes a remote unit 100-$i$ communicable with a radio frequency antenna 90-$i$ and a host unit 200 that receives a signal transmitted from the remote units 100 (1-N) over a digitized communication link 160-$i$. The host unit 200 is communicable with a receiving station 300. The connection to the receiving station can be hard wired, as indicated by connection 170, or wireless as indicated by connection 170A.

In one implementation of this embodiment, the radio frequency antenna 90 is a first radio frequency antenna, and the connection 170A to the receiving station 300 is established via a second radio frequency antenna 190. In another implementation of this embodiment, the connection 170A to the receiving station is established via a free-space optical link. In this case, a line-of-sight exists between the host unit 200 and the receiving station 300. In yet another implementation of this embodiment, the connection 170 to the receiving station is established via a physical media. For example, the communication between the host unit 200 and the receiving station 300 is over a hard wire connection such as a coaxial cable, optical fiber, or other broadband media.

Each digitized communication link 160-$i$ is an optical fiber link, a free-space optical link, a millimeter wave link, a coaxial cable link, a twisted-pair cable link, a broadband transmission link, a wireless transmission link, a physical medium transmission link, or a combination of one or more of these.

The receiving station 300 is a cellular base station, a personal communication system (PCS) base station, an Advanced Wireless Services (AWS) base station, or a Universal Mobile Telecommunications System (UMTS) base station. The term base station is also referred to as a "base station transceiver substation."

The remote unit 100-$i$, the digitized communication link 160-$i$ and the host unit 200 operate as a repeater station for the radio frequency signal 80-$i$. The information transmitted to the receiving station 300 via connection 170 or 170A is substantially the same as the information on the radio frequency signal 80, but it is amplified after being transmitted through the digitized reverse path transport link 50.

Figure 2:
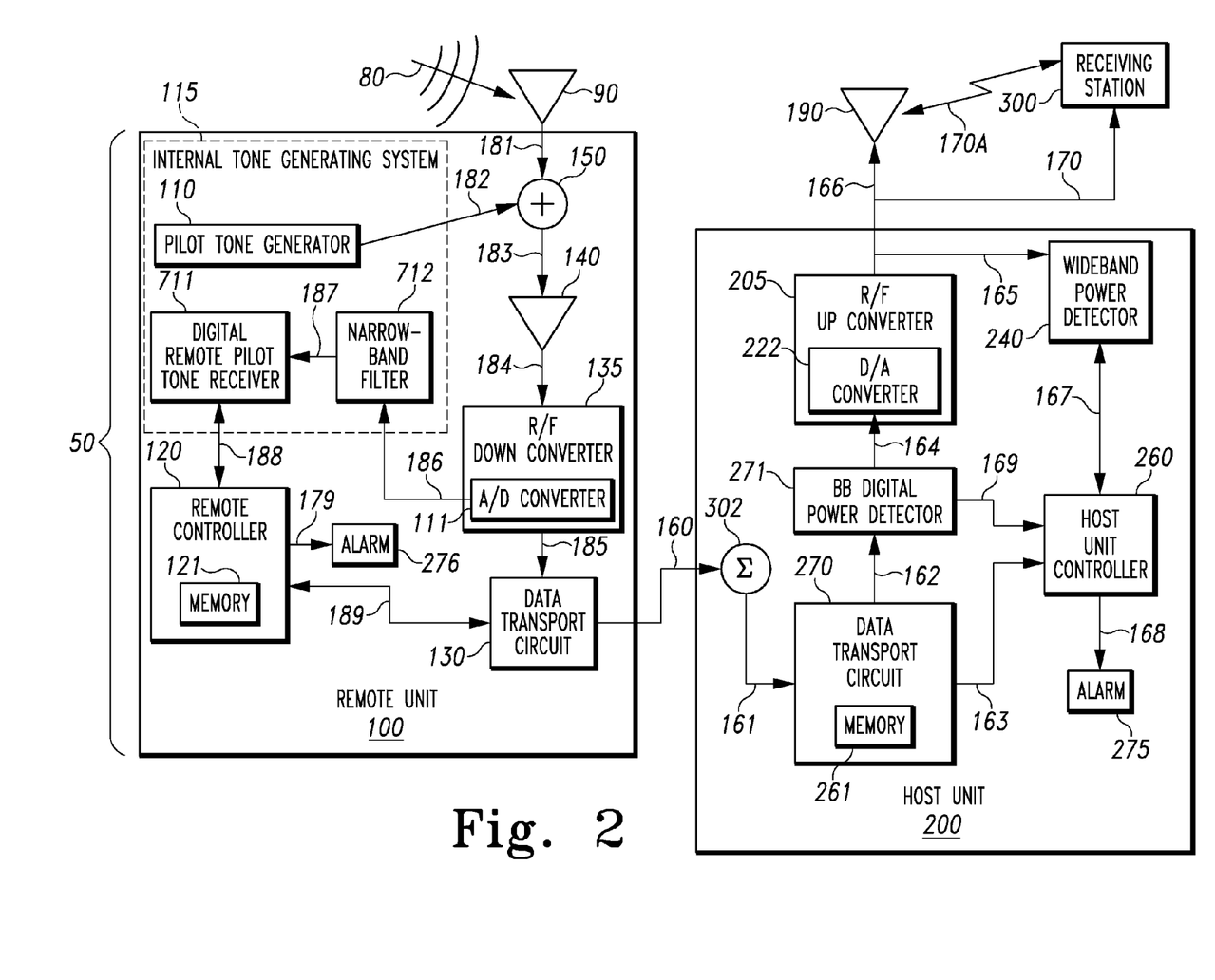
FIG. 2 illustrates a digitized reverse link in the digitized reverse link system in accordance with an embodiment of the present invention.

FIG. 2 illustrates a digitized reverse path transport link 50 in the digitized reverse link system 10 in accordance with an embodiment of the present invention. The digitized reverse path transport link 50 is communicatively coupled to the radio frequency antenna 90 that receives the radio frequency signal 80 and the receiving station 300. In one implementation of this embodiment, the digitized reverse path transport link 50 is communicatively coupled to the second radio frequency antenna 190 that transmits the radio frequency signal to the receiving station 300.

The remote unit 100 is operable to monitor the down-convert path in the digitized reverse link 160 by adding a single-frequency tone to the broadband signal before amplification and conditioning of the signal for transmission over the digitized communication link 160. The remote unit 100, which is representative of the remote units 100 (1-N) of FIG. 1, includes a pilot tone generator 110, a signal summing circuit 150, an amplifier 140, an radio frequency (RF) down-converter circuit 135, a data transport circuit 130, a digital remote pilot tone receiver 711, and a remote controller 120. The remote controller 120 includes a memory 121.

The remote controller 120 determines the health of the down-convert path as described below with reference to method 500 of FIG. 5 using an internal tone generating system 115. The internal tone generating system 115 includes the pilot tone generator 110, the narrowband filter 712, and the digital remote pilot tone receiver 711. The down-convert path is the radio frequency down-converter circuit 135. In one implementation of this embodiment, the down-convert path includes the radio frequency down-converter circuit 135 and the amplifier 140.

In one implementation of this embodiment as shown in FIG. 2, the remote unit 100 includes an alarm 276 that is communicatively coupled to the remote controller 120 via connection 179. The remote controller 120 is configured to trigger an alarm 276 to generate a warning based on a determination that the down-convert path is degraded.

The pilot tone generator 110 generates at least one single-frequency tone sent via connection 182 to signal summing circuit 150. The single-frequency tone has a known power level. A pilot tone is a single-frequency analog tone, thus, the terms "pilot tone" and "single-frequency tone" are interchangeably used in this document. A radio frequency synthesizer generates the pilot tone at the desired frequency using an external or an internal reference. The frequency can be programmed for the desired frequency and the pilot tone can be turned on and off. In one implementation of an embodiment of the pilot tone generator 110, the pilot tone is periodically generated. In this manner, the method 500 described below with reference FIG. 5 to determining health in a down-convert path is periodically implemented. In an exemplary case, the health in down-convert path is monitored every 15 minutes when a pilot tone is generated. In another exemplary case, the health in down-convert path is monitored every hour when the pilot tone is generated.

The signal summing circuit 150 is operably associated with the pilot tone generator 110 and sums the single-frequency tone with the received radio frequency signal received via connection 181 to form a combined signal that is output from the signal summing circuit 150 via connection 183.

Amplifier 140 is in communication with the summing circuit 150 via connection 183. The amplifier 140 is configured to amplify the combined signal and output the amplified combined signal to the RF down-converter circuit 135 via connection 184. In one implementation of the remote unit 100, the amplifier 140 is a low noise RF amplifier.

The radio frequency down-converter 135 includes an analog-to-digital converter 111. The analog-to-digital circuit (A/D) 111 converts the amplified combined signal to a digitized combined signal before it is transmitted over the digitized communication link 160. The digitized combined signal is sent via connection 185 to the data transport circuit 130. The digitized combined signal is also sent via connection 186 to the narrowband filter 712.

The data transport circuit 130 is communicatively coupled with the remote controller 120 via connection 189. In one implementation of this embodiment, the data transport circuit 130 sends information indicative of the down-converted digitized combined signal to the remote controller 120 via connection 189. The data transport circuit 130 is configured to transmit and receive information over the digitized communication link 160. It has the ability to transmit information over the digitized communication link 160 that is representative of the digitized combined signal that it receives from the radio frequency down-converter circuit 135 via connection 185.

While the digitized combined signal is sent from the data transport circuit 130 the narrowband filter 712 receives the down-converted digitized combined signal from the radio frequency down-converter 135 via connection 186. The narrowband filter 712 passes a narrow band of the digitized combined signal to the digital remote pilot tone receiver 711. The narrow band selected by the narrowband filter 712 includes the frequency of the pilot tone. The digital remote pilot tone receiver circuit 711 is configured to receive the narrowband digitized signal. The digital remote pilot tone receiver circuit 711 sends information indicative of the narrow band of the digitized combined signal to the remote controller 120 via connection 188. The remote controller 120 compares the known power level of the single-frequency tone to the power level of the narrowband digitized signal. The remote controller 120 determines the health of the down-convert path as described below with reference to method 500 of FIG. 5 based on this comparison. The known power is stored in the memory 121.

The host unit 200 is communicable with at least one digitized communication link 160. The host unit 200 is configured to receive the digitized combined signals sent from the plurality of remote units 100 (1-N) over the digitized communication links 160 (1-N). The digitized communication link 160 shown in FIG. 2 is representative of the digitized communication links 160 (1-N) shown in FIG. 1. The host unit 200 comprises a summation circuit 302, a data transport circuit 270, a baseband digital power detector 271, at least one radio frequency up converter 205, a wideband power detector 240, and a host unit controller 260. The data transport circuit 270 includes a memory 261. The radio frequency up converter 205 includes a digital-to-analog converter 222.

The host unit controller 260 determines the health of the up-convert path as described below with reference to method 600 of FIG. 6 using the baseband digital power detector 271 and the wideband power detector 240. The up-convert path is the radio frequency up-converter 205. In one implementation of this embodiment, the up-convert path includes the radio frequency up-converter 205, the data transport circuit 270 and the baseband digital power detector 271.

In one implementation of this embodiment as shown in FIG. 2, the host unit 200 includes an alarm 275 that is communicatively coupled to the host unit controller 260 via connection 168. The host unit controller 260 is configured to trigger an alarm 275 to generate a warning based on a determination that the up-convert path is degraded.

The summation circuit 302 sums the signals received via digitized communication links 160 (1-N) (FIG. 1) from the plurality of remote units 100 (1-N) and sends a digitized summed signal via connection 161 to the data transport circuit 270. The data transport circuit 270 receives the digitized summed signal from the summation circuit 302 and sends the digitized summed signal to a baseband digital power detector 271 via connection 162. The data transport circuit 270 also sends information indicative of the digitized summed signal to the host unit controller 260 via connection 163.

The baseband digital power detector 271 detects the digitized summed signal. The baseband digital power detector 271 is configured to send information indicative of the digitized summed signal to the host unit controller 260 via connection 169 and to the radio frequency up converter 205 via connection 164. The radio frequency up converter 205 is configured to send the up-converted, summed analog signals to the wideband power detector 240 via connection 165 and to the receiving station 300. The up-converted, summed analog signals 187 are also referred to herein as the "up-converted signals."

In one implementation of this embodiment, the up-converted signals are sent to the receiving station 300 via a connection 166 to antenna 190 and then via wireless connection 170A from the antenna 190. In another implementation of this embodiment, the up-converted signals are sent to the receiving station 300 via connection 170.

The wideband power detector 240 detects the up-converted, summed analog signals. The wideband power detector 240 is configured to send information indicative of the up-converted signals to the host unit controller 260 via connection 167.

The host unit controller 260 compares information indicative of the up-converted signals received from the wideband power detector 240 with information indicative of the digitized summed signal received from the data transport circuit 270 to determine the health of the up-converter path. The process is described in more detail below with reference to method 600 of FIG. 6.

The radio frequency signals 80 (1-N) (FIG. 1) which are received at the remote units 100 (1-N) are broadband and include one or more sub-bands within a defined frequency spectrum. FIG. 3A shows exemplary broadband frequency spectra 301 with sub-bands 310-340. Broadband frequency spectrum 301 includes a range of frequencies from 824 MHz to 849 MHz that are available for use in communication systems. A sub-band is an arbitrary bandwidth grouping that accommodates one or more standard bandwidths. Sub-band 310 is an A band and spans the range of frequencies from 824 MHz to 835 MHz. Sub-band 320 is a B band and spans the range of frequencies from 835 MHz to 845 MHz. Sub-band 330 is an A band and spans the range of frequencies from 845 MHz to 846.5 MHz. Sub-band 340 is a B band and spans the range of frequencies from 846.5 MHz to 849 MHz.

FIG. 3B shows exemplary broadband frequency spectra 800 with sub-bands 810-860. Broadband frequency spectrum 800 includes a range of frequencies from 1850 MHz to 1910 MHz that are also available for use in communication systems. Sub-band 810 is an A band and spans the range of frequencies from 1850 MHz to 1865 MHz. Sub-band 820 is a D band and spans the range of frequencies from 1865 MHz to 1870 MHz. Sub-band 830 is a B band and spans the range of frequencies from 1870 MHz to 1885 MHz. Sub-band 840 is an E band and spans the range of frequencies from 1885 MHz to 1890 MHz. Sub-band 850 is an F band and spans the range of frequencies from 1890 MHz to 1895 MHz. Sub-band 860 is a C band and spans the range of frequencies from 1895 MHz to 1910 MHz.

FIGS. 3A and 3B also show the position of exemplary pilot tones with respect to the frequency spectra 301 and 800. In FIG. 3A, exemplary pilot tones 350 and 360 are shown in frequency spectrum 305 in relative position to the frequency spectrum. Likewise in FIG. 3B, exemplary pilot tones 570 and 580 are shown in frequency spectrum 505 in relative position to the frequency spectrum 800.

As shown in FIG. 3A, one of the single-frequency tones 360 is at a frequency above the defined frequency spectrum 301 by frequency offset $\Delta v$. Another of the single-frequency tones 350 is at a frequency below the defined frequency spectrum 301 by frequency offset $\Delta v$. The frequency offset $\Delta v$ is indicative of a range of frequency offsets. The single-frequency tone or tones are positioned at a frequency or frequencies to minimize interference with received in-band radio frequency signals including frequencies above and below the frequency of the single-frequency tone or tones. In one implementation of the embodiment of FIG. 3A, the frequency offset $\Delta v$ is about equal to 100 KHz. In another implementation of the embodiment of FIG. 3A, the one or more single-frequency tones are at frequencies within the frequency spectrum 301. The frequency offset $\Delta v$ is chosen to minimize overlap and/or interference with the services in the bands above or below the defined frequency spectrum by avoiding carrier frequencies for these services.

As shown in FIG. 3B, one of the single-frequency tones 580 is at a frequency above the defined frequency spectrum 800 by frequency offset $\Delta v$. Another of the single-frequency tones 570 is at a frequency below the defined frequency spectrum 800 by frequency offset $\Delta v$. In one implementation of the embodiment of FIG. 3B, the frequency offset $\Delta v$ is about equal to 100 KHz. In another implementation of the embodiment of FIG. 3B, the one or more single-frequency tones are at frequencies within the frequency spectrum 800.

In an exemplary case, the broadband spectral range includes the EFC sub-bands of spectrum 800 in FIG. 3B and the single-frequency tone is generated above the frequency spectral range at the frequency of 1910.104 MHz.

The remote controller 120 executes software and/or firmware that causes the remote controller 120 to perform at least some of the processing described here as being performed by the remote unit 100. At least a portion of such software and/or firmware executed by the remote controller 120 and any related data structures are stored in memory 121 during execution. The software and/or firmware executed by the remote controller 120 comprises a plurality of program instructions that are stored or otherwise embodied on a storage medium, such as memory 121, from which at least a portion of such program instructions are read for execution by the remote controller 120. Memory 121 comprises any suitable memory now known or later developed such as, for example, random access memory (RAM), read only memory (ROM), and/or registers within the remote controller 120. In one implementation, the remote controller 120 comprises a microprocessor or microcontroller. Moreover, although the memory 121 is shown internal to the remote controller 120 in FIG. 2, the memory 121 and remote controller 120 are separate devices in one implementation.

Likewise, the host unit controller 260 executes software and/or firmware that causes the host unit controller 260 to perform at least some of the processing described here as being performed by the host unit 200. At least a portion of such software and/or firmware executed by the host unit controller 260 and any related data structures are stored in memory 261 during execution. The software and/or firmware executed by the host unit controller 260 comprises a plurality of program instructions that are stored or otherwise embodied on a storage medium, such as memory 261, from which at least a portion of such program instructions are read for execution by the host unit controller 260. Memory 261 comprises any suitable memory now known or later developed such as, for example, random access memory (RAM), read only memory (ROM), and/or registers within the host unit controller 260. In one implementation, the host unit controller 260 comprises a microprocessor or microcontroller. Moreover, although the memory 261 is shown internal to the host unit controller 260 in FIG. 2, the memory 261 and host unit controller 260 are separate devices in one implementation.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-R, DVD, and other optical disks. Any of the foregoing may be supplemented by, or incorporated in, specially-designed application-specific integrated circuits (ASICs).

Figure 4:
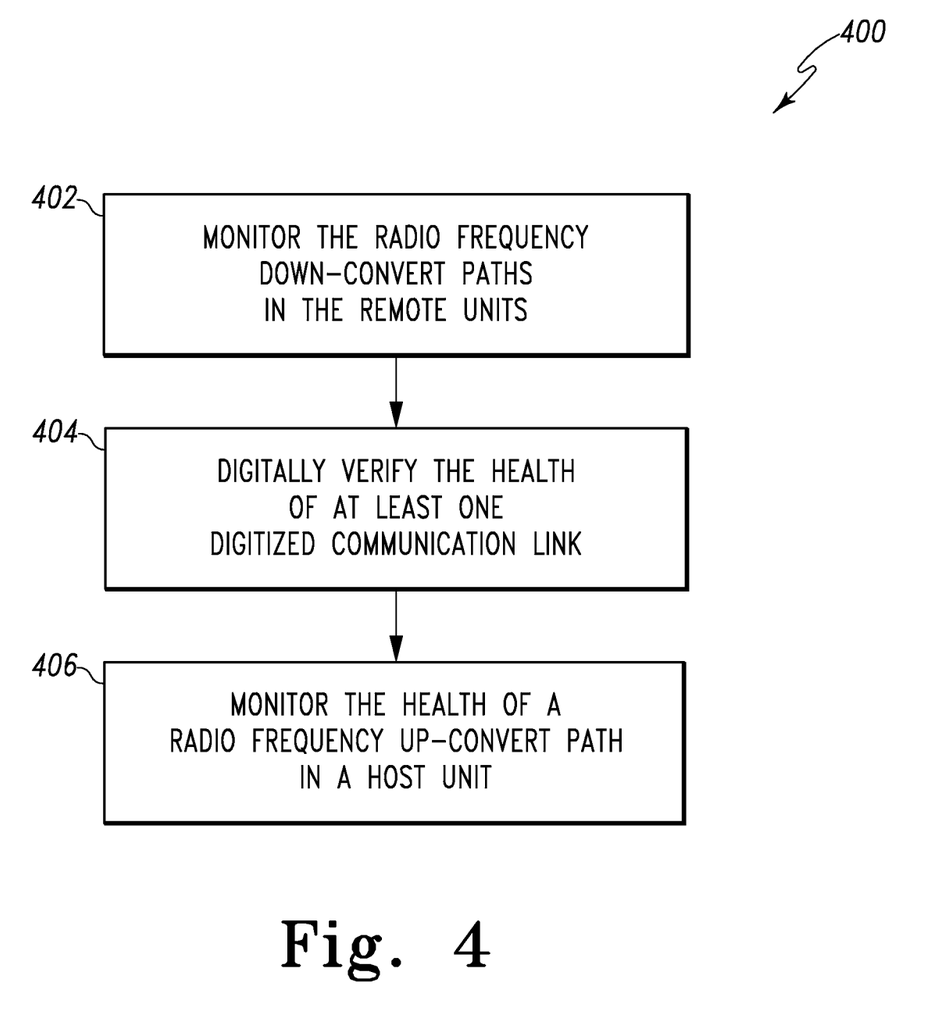
FIG. 4 is a flow diagram of one embodiment of a method to monitor a broadband digitized reverse link system.

FIG. 4 is a flow diagram of one embodiment of a method 400 to monitor a digitized reverse link system 10. Method 400 is described with reference to the digitized reverse link system 10 as shown in FIG. 1 and the exemplary digitized reverse path transport link 50 as shown in FIG. 2.

At block 402, the remote controller 120 in the remote units 100 (1-N) in the digitized reverse link system 10 monitor the radio frequency down-convert paths in the remote units 100 (1-N) in the digitized reverse link system 10 using an internal tone generating system 115. Details about the monitoring of the radio frequency down-convert paths are described below with reference to Method 500 of FIG. 5.

At block 404, the health of at least one digitized communication link 160-i is digitally verified. The digitized communication link 160-i is communicatively coupled to receive digital signals from a remote unit 100 and to transport the received digital signals to the host unit 200. When the unfiltered digitized combined signals are transmitted through the digitized communication link 160-i, an error check is performed on the unfiltered digitized combined signal. The error checks include parity checks, cyclic redundancy checks and the like, as is know in the art.

At block 406, the host unit controller 260 in the digitized reverse link system 10 monitors the health of a radio frequency up-convert path in a host unit 200 that is communicatively coupled to receive the digital signals from at least one digitized communication link 160 in the digitized reverse link system 10. The host unit controller 260 uses a wideband power detector 240 and the baseband digital power detector 271 to do the monitoring. Details about the monitoring of the radio frequency up-convert path are described below with reference to Method 600 of FIG. 6.

Figure 5:
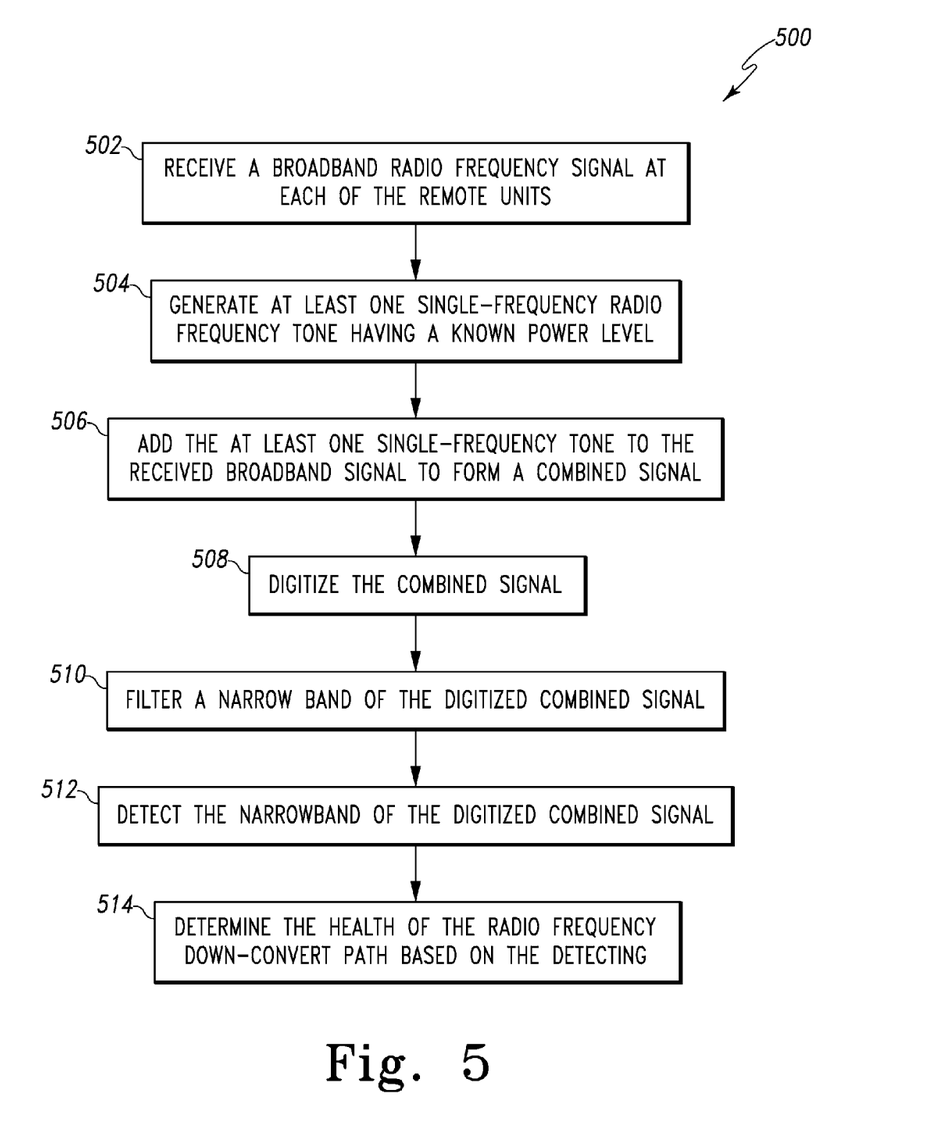
FIG. 5 is a flow diagram of one embodiment of a method to monitor at least one radio frequency down-convert path.

FIG. 5 is a flow diagram of one embodiment of a method 500 to monitor at least one radio frequency down-convert path. Method 500 is described with reference to the digitized reverse link system 10 as shown in FIG. 1 and the exemplary digitized reverse path transport link 50 as shown in FIG. 2. In one implementation of the embodiment of method 500, the received broadband radio frequency signal 80 is within a defined frequency spectrum 301 of FIG. 3A. In yet another implementation of the embodiment of method 400, the received broadband radio frequency signal 80 is within a frequency spectrum 800 of FIG. 3B.

At block 502, a broadband radio frequency signal 80-i is received at each of the respective remote units 100 (1-N). At block 504, at least one single-frequency tone is generated having a known power level. The single-frequency tone is generated at the pilot tone generator 110 in each of the remote units 100-i.

At block 506, the single-frequency tone is added to the received broadband signal 80-i at each of the remote units 100-i. The single-frequency tone and the received broadband signal 80-i form a combined signal when they are added. The combined signal is received at the amplifier 140 via connection 183 and is amplified by the amplifier 140. The amplifier 140 sends the amplified combined signal via connection 184 to the radio frequency down-converter 135.

At block 508, the combined amplified signal is digitized by the analog-to-digital converter 111 in the radio frequency down-converter 135 to form an unfiltered digitized combined signal. The unfiltered digitized combined signal is sent from the radio frequency down-converter 135 to the narrowband filter 712 via connection 186. The unfiltered digitized combined signal is also sent from the radio frequency down-converter 135 to the data transport circuit 130 via connection 185.

At block 510, a narrow band of the digitized combined signal is filtered by the narrowband filter 712 in the remote units 110 (1-N). The narrowband filter 712 passes a portion of the unfiltered digitized combined signal. The signal that is passed through the narrowband filter 712 is a narrowband digitized signal at frequency or frequencies of the pilot tone or pilot tones, respectively. For example, if the broadband radio frequency signal 80 received at the antenna 90 is within a defined frequency spectrum 301 of FIG. 3A, then the narrowband filter 712 passes that portion of the unfiltered digitized combined signal located at the frequency of the pilot tones 350 and 360. At block 512, the narrowband digitized signal is detected at a pilot tone receiver 711 in the remote unit 100. Information indicative of the narrowband digitized signal is sent to the remote controller 120 via connection 188. The information indicative of the narrowband digitized signal can be a root mean squared (rms) power level, a voltage level, and both the rms power level and the voltage level.

At block 514, the health of the radio frequency down-convert path is determined based on the detecting of the narrowband digitized signal at the digital remote pilot tone receiver 711. There are many ways to determine the health of the radio frequency down-convert path.

In one implementation of this embodiment, the level of the detected narrowband digitized signal is compared to a threshold. The radio frequency down-convert path is healthy when the level of the narrowband digitized signal is greater than the threshold. In one implementation of this embodiment, the remote controller 120 is configured to trigger an alarm 276 to generate a warning based on a determination that the difference in power level between the periodically generated single-frequency tones is greater than a selected threshold.

In another implementation of this embodiment, a power level of the single-frequency tone is calibrated as described in the '723 application. The calibration process is performed during an initialization phase of the remote unit 100-*i* and is not repeated unless another calibration is scheduled and/or needed. The calibrated single-frequency tone power level is stored in the memory 121 within remote controller 120.

In some embodiments, the pilot tone is periodically generated. In one implementation of this embodiment, the remote controller 120 is configured to trigger the alarm 276 to generate a warning based on a determination that the power level between the periodically generated single-frequency tones has degraded by 6 dB or more than 6 dB. In one implementation of this embodiment, the remote unit 100-*i* monitors for a drop in power level of more than 6 dB in one hour.

In one implementation of this embodiment, determining the health of the radio frequency down-convert path is based on determining a ratio of the power level of a current filtered narrowband signal to the power level of the calibrated single-frequency tone. When the ratio of the power level of a current filtered narrowband signal to the power level of the calibrated single-frequency tone is greater than a selected ratio, the radio frequency down-convert path is healthy. The ratio of the received power level to the calibrated power level is used to determine if the power level of the signal received is about the desired power level of the digitized reverse path transport link 50.

In another implementation of this embodiment, the remote controller 120 determines a ratio of the power level of the current single-frequency tone to a power level of a previously-measured single-frequency tone. The power level of a previously-measured single-frequency tone is the power level of the detected narrowband digitized signal received at the digital remote pilot tone receiver 711 during a monitoring event that occurred prior to the last monitoring event. Such a monitoring event occurs more than two periods ago. In the case in which the pilot tone is generated once every five minutes, the previously-measured single-frequency tone power level is the power level of the detected narrowband digitized signal received at the digital remote pilot tone receiver 711 more than nine minutes ago. The ratio of the power level of the current single-frequency tone to a power level of a previously-measured single-frequency tone indicates a change in the power level in the transmission link in the remote unit 100-*i*. In this case, the remote unit 100-*i* monitors for slow drifts in the power level.

In yet another implementation, the current single-frequency tone includes a plurality of single-frequency tones that are sequentially generated in a preset time. For example, the plurality of single-frequency tones includes two or more frequencies. In an exemplary case of this embodiment, at least one single-frequency tone has a frequency above the in-band frequency and at least one other single-frequency tone has a frequency below the in-band frequency.

In yet another implementation, the remote controller 120 compares a peak-hold power level or an average power level for the sequentially generated plurality of single-frequency tones to a power level of the calibrated single-frequency tone. In an exemplary case, the pilot tone is sequentially measured 100 times at the host unit 200 during a monitoring event that lasts for the preset time of ten seconds. The highest power level or the average power level for all the 100 transmitted pilot tones is used to determine the power level. The peak-hold function or the averaging function is useful if the communication traffic on the radio frequency signals 80 is very near the single-frequency of the pilot tone signal and they sometimes destructively interfere. If a series of measurements are made and the largest power level is used to determine the power level, then the potential for alarms due to random destructive interference is reduced.

In yet another implementation of this embodiment, the remote controller 120 measures the power level of each of the received single-frequency tones that were sequentially generated in a preset time, takes a peak-hold power level for all the sequential measurements and compares the peak-hold power level to the power level of the calibrated single-frequency tone. A peak-hold function in the remote controller 120 determines the peak power level for all the pilot tone measurements.

In yet another implementation, the remote controller 120 measures the power level of each of the received single-frequency tones that were sequentially generated in a preset time, takes an average power level for all the measurements and compares the average power level to the power level of the calibrated single-frequency tone. An averaging function in the remote controller 120 determines the average power level for all the pilot tone measurements.

In yet another implementation, the remote controller 120 takes sequential measurements of the single-frequency tone that was generated for an extended duration, takes a peak-hold power level for all the sequential measurement and compares the peak-hold power level to the power level of the calibrated single-frequency tone.

In yet another implementation, the remote controller 120 takes sequential measurements of the single-frequency tone that was generated for an extended duration, takes an average power level of all the sequential measurements and compares the average power level to the power level of the calibrated single-frequency tone.

In each of these embodiments, if the power levels or ratios are acceptable power levels or ratios, the down-convert path is determined to be healthy. The acceptable power level or ratio is stored in memory 121. The remote controller 120 compares the current power level with the acceptable power level. In one implementation of this embodiment, the acceptable power level is a range of power levels. If the remote unit 100-*i* monitors for drifts in the power level, then the remote controller 120 has stored in memory 121 acceptable changes in the power levels or ratios of the power levels. In one implementation of this embodiment, the remote controller 120 determines a percentage change in power level and compares the measured percentage change in power level with an acceptable percentage change in power level that is stored in memory 121. If the power level and/or percentage change is not within the acceptable range the remote controller 120 triggers the alarm 276 and the alarm 276 generates a warning that the down-convert path is not healthy. In one implementation of this embodiment, an alarm signal is sent to the receiving station 300. In one implementation of this embodiment, the alarm signal is sent to the host unit 200.

Figure 6:
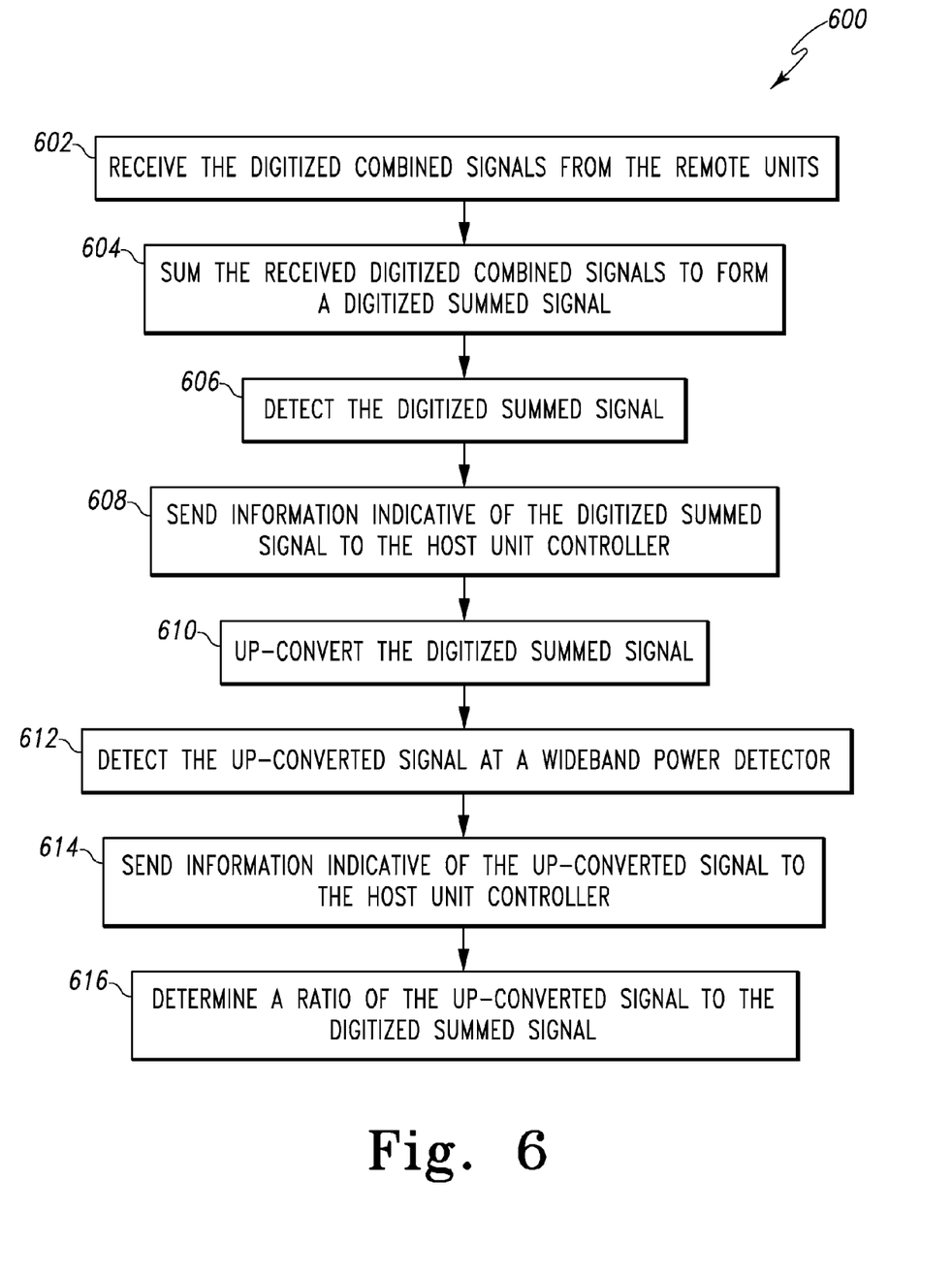
FIG. 6 is a flow diagram of one embodiment of a method to monitor at least one radio frequency up-convert path.

FIG. 6 is a flow diagram of one embodiment of a method 600 to monitor at least one radio frequency up-convert path. Method 600 is described with reference to the digitized reverse link system 10 as shown in FIG. 1 and the digitized reverse path transport link 50 as shown in FIG. 2. In one implementation of the embodiment of method 600, the received broadband radio frequency signal 80 is within a defined frequency spectrum 301 of FIG. 3A. In yet another implementation of the embodiment of method 400, the received broadband radio frequency signal 80 is within a frequency spectrum 800 of FIG. 3B.

At block 602, the digitized combined signals are received from all of the remote units 110 (1-N) via digitized communication links 160 (1-N) at the summation circuit 302. At block 604, the summation circuit 302 sums the received signals to form the digitized summed signal, and sends the digitized summed signal to the data transport circuit 270 via connection 161. The data transport circuit 270 processes the digitized summed signal and sends the digitized summed signal to the baseband digital power detector 271 via connection 162. At block 604, the digitized summed signal is detected at the baseband digital power detector 271. At block 608, the baseband digital power detector sends information indicative of the digitized summed signal to the host unit controller 260 via connection 169. The baseband digital power detector 271 also sends the digitized summed signal to the radio frequency up-converter 205 via connection 164. At block 610, the radio frequency up-converter 205 up-converts the digitized summed signal. An analog radio frequency signal (also referred to herein as "up-converted signal") is generated at the digital-to-analog converter 222 in the radio frequency up-converter 205. The radio frequency up-converter 205 sends the up-converted signal to the wideband power detector 240 via connection 165.

At block 612, the up-converted signal is detected at a wideband power detector 240. At block 614, information indicative of the up-converted signal is sent from the wideband power detector 240 to the host unit controller 260 via connection 167.

At block 616, the host unit controller 260 determine a ratio of the up-converted signal to the digitized summed signal to determine the health of the radio frequency up-convert path by comparing the information indicative of the up-converted signals received from the wideband power detector 140 to the information indicative of the digitized summed signals received from the baseband digital power detector 271.

The information indicative of the digitized summed signal that was received at the host unit controller 260 from the baseband digital power detector 271 can be an rms power level, or a voltage level. In one implementation of this embodiment, the information indicative of the digitized summed signal is both the rms power level and the voltage level.

The information indicative of the up-converted signal that was received at the host unit controller 260 from the wideband power detector 240 can be an rms power level, a voltage level, or both the rms power level and the voltage level.

In one implementation of this embodiment, comparing the information indicative of the up-converted signal to the information indicative of the digitized summed signal is comparing the rms power level indicative of the digitized summed signal to the rms power level indicative of the up-converted signal. In another implementation of this embodiment, comparing the information indicative of the up-converted signal to the information indicative of the digitized summed signal is comparing the voltage level indicative of the digitized summed signal to the voltage level indicative of the up-converted signal. The health of the up-convert path is good when the ratio is above (or below) a selected ratio. The selected ratio is stored in the memory 261.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of monitoring a broadband digitized reverse link system, the method comprising:
   internally monitoring at least one radio frequency down-convert path in at least one remote unit in the digitized reverse link system using an internal tone generating system in the at least one remote unit, wherein the internal tone generating system generates at least one single-frequency radio frequency tone and receives feedback of a combined signal that includes a broadband signal received at the remote unit summed with the generated single-frequency radio frequency tone; and
   digitally verifying the health of at least one digitized communication link communicatively coupled to receive digital signals from a respective remote unit.

2. The method of claim 1, wherein internally monitoring at least one radio frequency down-convert path comprises:
   receiving the broadband radio frequency signal at the remote units;
   generating the at least one single-frequency radio frequency tone having a known power level at a pilot tone generator in the remote units;
   adding the at least one single-frequency tone to the received broadband signal to form the combined signal at the remote units;
   digitizing the combined signal;
   filtering a narrow band of the digitized combined signal at the remote unit to form a narrowband digitized signal;
   detecting the narrowband digitized signal at the remote unit at a pilot tone receiver; and
   determining the health of the radio frequency down-convert path based on the detecting.

3. The method of claim 2, wherein digitally verifying the health of at least one digitized communication link comprises:
   transmitting the unfiltered digitized combined signal through the digitized communication link; and
   performing an error check of the unfiltered digitized combined signal transmitted on all of the at least one digitized communication links in the broadband digitized reverse link.

4. The method of claim 2, wherein the generating is a periodic generating.

5. The method of claim 4, wherein determining the health of the radio frequency down-convert path comprises:
   determining a ratio of a power level of a current filtered narrowband signal to a power level of a last-measured filtered narrowband signal.

6. The method of claim 5, wherein determining the health of the radio frequency down-convert path further comprises:
   determining a ratio of the power level of the current filtered narrowband signal to a power level of a previously measured filtered narrowband signal.

7. The method of claim 4, wherein determining the health of the radio frequency down-convert path comprises:
   determining a ratio of the power level of a current filtered narrowband signal to a power level of a previously measured filtered narrowband signal.

8. The method of claim 4, further comprising:
   calibrating a power level of the at least one single-frequency tone, wherein the determining the health of the radio frequency down-convert path comprises,
   determining a ratio of the power level of a current filtered narrowband signal to the power level of the calibrated single-frequency tone.

9. The method of claim 2, wherein determining the health of the radio frequency down-convert path comprises:

comparing a level of the detected narrowband digitized signal to a threshold, wherein the radio frequency down-convert path is healthy when the level of the detected narrowband digitized signal is greater than the threshold.

10. The method of claim 1, further comprising:

monitoring the health of a radio frequency up-convert path in a host unit communicatively coupled to receive the digital signals from the at least one digitized communication link in the digitized reverse link system using a wideband power detector in the host unit.

11. The method of claim 10, wherein monitoring the health of a radio frequency up-convert path in the host unit comprises:

receiving the digitized combined signals from all of the at least one remote units at a summation circuit in the host unit;

summing the received digitized combined signals to form a digitized summed signal;

detecting the digitized summed signal at a baseband digital power detector;

up converting the digitized summed signal responsive to the receiving;

detecting the up-converted signal at the wideband power detector; and determining a ratio of the up-converted signal to the digitized summed signal to determine the health of the radio frequency up-convert path.

12. The method of claim 11, wherein determining a ratio of the up-converted signals to the digitized summed signal comprises:

sending information indicative of the digitized summed signal from the baseband digital power detector to the host unit controller;

sending information indicative of the up-converted signal from the wideband power detector to the host unit controller; and comparing the information indicative of the up-converted signals to the information indicative of the digitized summed signals.

* * * * *